United States Patent
Habara et al.

(10) Patent No.: US 11,196,823 B2
(45) Date of Patent: Dec. 7, 2021

(54) SERVICE DEPLOYMENT CONTROL SYSTEM, SERVICE DEPLOYMENT CONTROL METHOD, AND STORAGE MEDIUM

(71) Applicant: Hitachi, Ltd., Tokyo (JP)

(72) Inventors: Takuya Habara, Tokyo (JP); Daisuke Ishii, Tokyo (JP); Yuji Ogata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 14 days.

(21) Appl. No.: 16/795,621

(22) Filed: Feb. 20, 2020

(65) Prior Publication Data
US 2021/0067593 A1 Mar. 4, 2021

(30) Foreign Application Priority Data

Aug. 27, 2019 (JP) .............................. JP2019-154886

(51) Int. Cl.
*H04L 29/08* (2006.01)
*G06Q 30/02* (2012.01)

(52) U.S. Cl.
CPC ......... *H04L 67/16* (2013.01); *G06Q 30/0283* (2013.01)

(58) Field of Classification Search
CPC ............................ H04L 67/16; G06Q 30/0283
See application file for complete search history.

(56) References Cited

U.S. PATENT DOCUMENTS

| | | | | |
|---|---|---|---|---|
| 2012/0072910 A1* | 3/2012 | Martin | ................... | G06F 9/4843 718/1 |
| 2012/0131591 A1* | 5/2012 | Moorthi | ................... | H04L 67/10 718/104 |
| 2012/0259983 A1* | 10/2012 | Nakadai | ................ | G06F 9/5083 709/226 |
| 2013/0046887 A1* | 2/2013 | Malloy | ................. | H04L 41/145 709/224 |
| 2016/0019636 A1* | 1/2016 | Adapalli | ................. | H04L 47/70 705/26.62 |

FOREIGN PATENT DOCUMENTS

WO    2011/074699 A1    6/2011

* cited by examiner

*Primary Examiner* — Philip J Chea
*Assistant Examiner* — Hassan A Khan
(74) *Attorney, Agent, or Firm* — Mattingly & Malur, PC

(57) ABSTRACT

A service deployment control system includes a machine management module, a network management module, a service management module and a service deployment destination determination module. The machine management module is configured to acquire information on an operation of the service providing computer. The network management module is configured to acquire information on cooperation among a plurality of services. The service management module is configured to manage a condition for a computer resource that is set to and required for each of the services. The service deployment destination determination module is configured to select a service providing computer satisfying the condition for the computer resource required for the service out of the information on the operation as a candidate of a deployment destination of the service, generate combinations of the candidates as deployment patterns, calculate a deployment cost for each of the deployment patterns, select one of the deployment patterns.

9 Claims, 22 Drawing Sheets

161 MACHINE OPERATION STATE TABLE

| SERVICE DEPLOYMENT MACHINE NAME | STORAGE REMAINING CAPACITY | AVAILABLE CALCULATION AMOUNT | DATA PROCESSING SERVICE NAME |
|---|---|---|---|
| MACHINE A | 10G | 100K | |
| MACHINE B | 20G | 100K | |
| MACHINE C | 300M | 200 | |
| MACHINE D | 1T | 1M | |
| 1610 | 1611 | 1612 | 1613 |

FIG. 3

164 DELAY TIME TABLE

| DEVICE NAME | SERVICE DEPLOYMENT MACHINE NAME | DELAY TIME |
|---|---|---|
| DEVICE A | MACHINE A | 20ms |
| | MACHINE B | 30ms |
| | MACHINE C | 1s |
| | MACHINE D | 1s |
| DEVICE B | MACHINE A | 1s |
| | MACHINE B | 1s |
| | MACHINE C | 20ms |
| | MACHINE D | 30ms |
| 1640 | 1641 | 1642 |

FIG. 4

163a INTER-DATA-PROCESSING-SERVICE COMMUNICATION AMOUNT INFORMATION TABLE

|  | SERVICE ON RECEPTION SIDE | | | |
|---|---|---|---|---|
|  | DATA PROCESSING SERVICE A | DATA PROCESSING SERVICE B | DATA PROCESSING SERVICE C | DATA PROCESSING SERVICE D |
| DATA PROCESSING SERVICE A |  | 400 | - | - |
| DATA PROCESSING SERVICE B | 10 |  | - | 200 |
| DATA PROCESSING SERVICE C | - | - |  | 400 |
| DATA PROCESSING SERVICE D | - | 20 | 10 |  |

(SERVICE ON TRANSMISSION SIDE)

COMMUNICATION AMOUNT THRESHOLD VALUE: 1K — 1631

*FIG. 5A*

163b INTER-SERVICE-DEPLOYMENT-MACHINE COMMUNICATION AMOUNT INFORMATION TABLE

|  | MACHINE ON RECEPTION SIDE | | | |
|---|---|---|---|---|
|  | MACHINE A | MACHINE B | MACHINE C | MACHINE D |
| MACHINE A |  | 400 | - | - |
| MACHINE B | 10 |  | - | 200 |
| MACHINE C | - | - |  | 400 |
| MACHINE D | - | 20 | 10 |  |

(MACHINE ON TRANSMISSION SIDE)

*FIG. 5B*

165 SERVICE OPERATION STATE TABLE

| DATA PROCESSING SERVICE NAME | REQUIRED CALCULATION AMOUNT | REQUIRED STORAGE CAPACITY | PERMISSIBLE DELAY AMOUNT | DEPLOYMENT-AVAILABLE MACHINE NAME | DEPLOYMENT DESTINATION MACHINE NAME | RELEVANT DATA PROCESSING SERVICE NAME |
|---|---|---|---|---|---|---|
| DATA PROCESSING SERVICE A | 3K | 100M | 10s | MACHINE A, MACHINE B, MACHINE C, MACHINE D | | |
| DATA PROCESSING SERVICE B | 100K | 100M | 20ms | MACHINE A | | |
| DATA PROCESSING SERVICE C | 10 | 1G | 10s | MACHINE A, MACHINE B, MACHINE C, MACHINE D | | |
| DATA PROCESSING SERVICE D | 20 | 1G | 10s | MACHINE A, MACHINE B, MACHINE C, MACHINE D | | |
| 1650 | 1651 | 1652 | 1653 | 1654 | 1655 | 1656 |

*FIG. 6*

162 COMMUNICATION COST TABLE

|  | MACHINE A | MACHINE B | MACHINE C | MACHINE D |
|---|---|---|---|---|
| MACHINE A |  | 10 | 100 | 100 |
| MACHINE B | 10 |  | 100 | 100 |
| MACHINE C | 100 | 100 |  | 10 |
| MACHINE D | 100 | 100 | 10 |  |

*FIG. 7*

166 DEPLOYMENT COST TABLE

|  | MACHINE A | MACHINE B | MACHINE C | MACHINE D |
|---|---|---|---|---|
| MACHINE A |  | 4K | - | - |
| MACHINE B | 100 |  | - | 20K |
| MACHINE C | - | - |  | 4K |
| MACHINE D | - | 2K | 100 |  |

*FIG. 8*

1721 COMMUNICATION AMOUNT THRESHOLD VALUE EXCESS DETERMINATION TABLE

| NUMBER | COMMUNICATION AMOUNT THRESHOLD VALUE EXCESS DETERMINATION METHOD NAME |
|---|---|
| 1 | EXCESS OF INSTANTANEOUS VALUE |
| 2 | CONTINUOUS $n$ TIMES OF EXCESS OF INSTANTANEOUS VALUE |
| 3 | $n$ TIMES OF EXCESS OF AVERAGE VALUE |
| 4 | $n$ TIMES OF EXCESS OF MAXIMUM VALUE |
| 5 | USER DEFINITION |

163a-1 INTER-DATA-PROCESSING-SERVICE COMMUNICATION AMOUNT INFORMATION TABLE

| TRANSMISSION SIDE \ RECEPTION SIDE | Adapter-A | Adapter-B | Analysis-A | Analysis-B | Analysis-C |
|---|---|---|---|---|---|
| Adapter-A | | | | | |
| Adapter-B | | | | | |
| Analysis-A | | | | | |
| Analysis-B | | | | | |
| Analysis-C | | | | | |

COMMUNICATION AMOUNT THRESHOLD VALUE: 1K ~1631-1

*FIG. 14*

161-1 MACHINE OPERATION STATE TABLE

| SERVICE DEPLOYMENT MACHINE NAME | STORAGE REMAINING CAPACITY | AVAILABLE CALCULATION AMOUNT | DATA PROCESSING SERVICE NAME |
|---|---|---|---|
| Machine-A | 20G | 1K | |
| Machine-B | 250G | 1M | |
| Machine-C | 20G | 1K | |
| Machine-D | 250G | 1M | |
| Cloud-A | 1T | 2M | |

162-1 COMMUNICATION COST TABLE

| | Machine-A | Machine-B | Machine-C | Machine-D | Cloud-A |
|---|---|---|---|---|---|
| Machine-A | | 10 | 100 | 100 | 1K |
| Machine-B | 10 | | 100 | 100 | 1K |
| Machine-C | 100 | 100 | | 10 | 1K |
| Machine-D | 100 | 100 | 10 | | 1K |
| Cloud-A | 1K | 1K | 1K | 1K | |

*FIG. 16*

165-1 SERVICE OPERATION STATE TABLE

| DATA PROCESSING SERVICE NAME | REQUIRED CALCULATION AMOUNT | REQUIRED STORAGE CAPACITY | PERMISSIBLE DELAY AMOUNT | DEPLOYMENT-AVAILABLE MACHINE NAME | DEPLOYMENT DESTINATION MACHINE | RELEVANT SERVICE |
|---|---|---|---|---|---|---|
| Adapter-A | 20 | 1G | 20ms | | | |
| Adapter-B | 20 | 1G | 20ms | | | |
| Adapter-A | 100K | 10G | 10s | | | |
| Adapter-B | 100K | 10G | 10s | | | |
| Adapter-C | 100K | 10G | 10s | | | |
| 1650-1 | 1651-1 | 1652-1 | 1653-1 | 1654-1 | 1655-1 | 1656-1 |

FIG. 17

164-1 DELAY TIME TABLE

| DEVICE NAME | SERVICE DEPLOYMENT MACHINE NAME | DELAY TIME |
|---|---|---|
| Device-A | Machine-A | 10ms |
| | Machine-B | 25ms |
| | Machine-C | 1s |
| | Machine-D | 1s |
| | Cloud-A | 3s |
| Device-B | Machine-A | 1s |
| | Machine-B | 1s |
| | Machine-C | 10ms |
| | Machine-D | 25ms |
| | Cloud-A | 3s |

165-2 SERVICE OPERATION STATE TABLE

| DATA PROCESSING SERVICE NAME | REQUIRED CALCULATION AMOUNT | REQUIRED STORAGE CAPACITY | PERMISSIBLE DELAY AMOUNT | DEPLOYMENT-AVAILABLE MACHINE NAME | DEPLOYMENT DESTINATION MACHINE | RELEVANT SERVICE |
|---|---|---|---|---|---|---|
| Adapter-A | 20 | 1G | 20ms | Machine-A | | |
| Adapter-B | 20 | 1G | 20ms | Machine-C | | |
| Adapter-A | 100K | 10G | 10s | Machine-B, Machine-D, Cloud-A | | |
| Adapter-B | 100K | 10G | 10s | Machine-B, Machine-D, Cloud-A | | |
| Adapter-C | 100K | 10G | 10s | Machine-B, Machine-D, Cloud-A | | |
| 1650-2 | 1651-2 | 1652-2 | 1653-2 | 1654-2 | 1655-2 | 1656-2 |

*FIG. 19*

161-2 MACHINE OPERATION STATE TABLE

| SERVICE DEPLOYMENT MACHINE NAME | STORAGE REMAINING CAPACITY | AVAILABLE CALCULATION AMOUNT | DATA PROCESSING SERVICE NAME |
|---|---|---|---|
| Machine-A | 19G | 980 | Adapter-A |
| Machine-B | 240G | 0.9M | Analysis-A |
| Machine-C | 19G | 980 | Adapter-B |
| Machine-D | 240G | 0.9M | Analysis-B |
| Cloud-A | 990G | 1.9M | Analysis-C |
| 1610-2 | 1611-2 | 1612-2 | 1613-2 |

165-3 SERVICE OPERATION STATE TABLE

| DATA PROCESSING SERVICE NAME | REQUIRED CALCULATION AMOUNT | REQUIRED STORAGE CAPACITY | PERMISSIBLE DELAY AMOUNT | DEPLOYMENT-AVAILABLE MACHINE NAME | DEPLOYMENT DESTINATION MACHINE | RELEVANT SERVICE |
|---|---|---|---|---|---|---|
| Adapter-A | 20 | 1G | 20ms | Machine-A | Machine-A | |
| Adapter-B | 20 | 1G | 20ms | Machine-C | Machine-C | |
| Adapter-A | 100K | 10G | 10s | Machine-B, Machine-D, Cloud-A | Machine-B | |
| Adapter-B | 100K | 10G | 10s | Machine-B, Machine-D, Cloud-A | Machine-D | |
| Adapter-C | 100K | 10G | 10s | Machine-B, Machine-D, Cloud-A | Cloud-A | |
| 1650-3 | 1651-3 | 1652-3 | 1653-3 | 1654-3 | 1655-3 | 1656-3 |

FIG. 22

163a-2 INTER-DATA-PROCESSING-SERVICE COMMUNICATION AMOUNT INFORMATION TABLE

RECEPTION SIDE

| TRANSMISSION SIDE | Adapter-A | Adapter-B | Analysis-A | Analysis-B | Analysis-C |
|---|---|---|---|---|---|
| Adapter-A |  | - | 200K | - | - |
| Adapter-B | - |  | - | 400K | - |
| Analysis-A | 10 | - |  | - | 100K |
| Analysis-B | - | 20 | - |  | 200K |
| Analysis-C | - | - | 20 | 40 |  |

COMMUNICATION AMOUNT THRESHOLD VALUE

| 1K | ~1631-2 |

*FIG. 23*

165-4 SERVICE OPERATION STATE TABLE

| DATA PROCESSING SERVICE NAME | REQUIRED CALCULATION AMOUNT | REQUIRED STORAGE CAPACITY | PERMISSIBLE DELAY AMOUNT | DEPLOYMENT-AVAILABLE MACHINE NAME | DEPLOYMENT DESTINATION MACHINE | RELEVANT SERVICE |
|---|---|---|---|---|---|---|
| Adapter-A | 20 | 1G | 20ms | Machine-A | Machine-A | Analysis-A |
| Adapter-B | 20 | 1G | 20ms | Machine-C | Machine-C | Analysis-B |
| Adapter-A | 100K | 10G | 10s | Machine-B, Machine-D, Cloud-A | Machine-B | Analysis-C |
| Adapter-B | 100K | 10G | 10s | Machine-B, Machine-D, Cloud-A | Machine-D | Analysis-C |
| Adapter-C | 100K | 10G | 10s | Machine-B, Machine-D, Cloud-A | Cloud-A | - |
| 1650-4 | 1651-4 | 1652-4 | 1653-4 | 1654-4 | 1655-4 | 1656-4 |

FIG. 24

163b-1A INTER-SERVICE-DEPLOYMENT-MACHINE COMMUNICATION AMOUNT INFORMATION TABLE

TRANSMISSION SIDE / RECEPTION SIDE

| | Machine-A | Machine-B | Machine-C | Machine-D | Cloud-A |
|---|---|---|---|---|---|
| Machine-A | | - | - | 200K | - |
| Machine-B | - | | - | - | - |
| Machine-C | - | - | | 400K | - |
| Machine-D | 10 | - | 20 | | - |
| Cloud-A | - | - | - | - | |

*FIG. 26A*

163b-1B INTER-SERVICE-DEPLOYMENT-MACHINE COMMUNICATION AMOUNT INFORMATION TABLE

TRANSMISSION SIDE / RECEPTION SIDE

| | Machine-A | Machine-B | Machine-C | Machine-D | Cloud-A |
|---|---|---|---|---|---|
| Machine-A | | 200K | - | - | - |
| Machine-B | 10 | | 20 | - | - |
| Machine-C | - | 400K | | - | - |
| Machine-D | - | - | - | | - |
| Cloud-A | - | - | - | - | |

*FIG. 26B*

163b-1C INTER-SERVICE-DEPLOYMENT-MACHINE COMMUNICATION AMOUNT INFORMATION TABLE

TRANSMISSION SIDE / RECEPTION SIDE

| | Machine-A | Machine-B | Machine-C | Machine-D | Cloud-A |
|---|---|---|---|---|---|
| Machine-A | | - | - | - | 200K |
| Machine-B | - | | - | - | - |
| Machine-C | - | - | | - | 400K |
| Machine-D | - | - | - | | - |
| Cloud-A | 10 | - | 20 | - | |

*FIG. 26C*

166-1A DEPLOYMENT COST TABLE

RECEPTION SIDE

| TRANSMISSION SIDE | Machine-A | Machine-B | Machine-C | Machine-D | Cloud-A |
|---|---|---|---|---|---|
| Machine-A |  | - | - | 20M | - |
| Machine-B | - |  | - | - | - |
| Machine-C | - | - |  | 4M | - |
| Machine-D | 1K | - | 200 |  | - |
| Cloud-A | - | - | - | - |  |

*FIG. 27A*

166-1B DEPLOYMENT COST TABLE

RECEPTION SIDE

| TRANSMISSION SIDE | Machine-A | Machine-B | Machine-C | Machine-D | Cloud-A |
|---|---|---|---|---|---|
| Machine-A |  | 2M | - | - | - |
| Machine-B | 100 |  | 2K | - | - |
| Machine-C | - | 40M |  | - | - |
| Machine-D | - | - | - |  | - |
| Cloud-A | - | - | - | - |  |

*FIG. 27B*

166-1C DEPLOYMENT COST TABLE

RECEPTION SIDE

| TRANSMISSION SIDE | Machine-A | Machine-B | Machine-C | Machine-D | Cloud-A |
|---|---|---|---|---|---|
| Machine-A |  | - | - | - | 200M |
| Machine-B | - |  | - | - | - |
| Machine-C | - | - |  | - | 400M |
| Machine-D | - | - | - |  | - |
| Cloud-A | 10K | - | 20K | - |  |

*FIG. 27C*

SERVICE DEPLOYMENT CONTROL SYSTEM, SERVICE DEPLOYMENT CONTROL METHOD, AND STORAGE MEDIUM

CLAIM OF PRIORITY

The present application claims priority from Japanese patent application JP 2019-154886 filed on Aug. 27, 2019, the content of which is hereby incorporated by reference into this application.

BACKGROUND

This invention relates to a service deployment control system and a service deployment control method.

As the Internet of Things (IoT) develops, devices coupled to networks are rapidly increasing. An activity aiming at an increase in efficiency and precision through data processing of collecting, analyzing, and visualizing data from those devices without relying on human empirical values and intuition has become active. The application of IoT technologies is accelerated also in the industrial field, and there have been investigated or implemented various usages such as monitoring and control of production machines, quality control of products, work management of workers, and further, traceability and optimization of processes.

Hitherto, a service for data processing has been configured as a system of the data aggregation type, which is constructed by one machine for each process or each site. However, in recent years, there have been increasing needs for the full value chain, which manages information on purchase to procurement, production, and sales in a unified manner to optimally arrange workers and materials, and the related-art system of the data aggregation type cannot handle such a case. It is accordingly required to mutually utilize data between, for example, different processes and different sites.

In order to achieve this, it is required to aggregate or distribute destinations of deployment of data collection and analysis functions that have been executed in the respective processes and sites as required, and flexibly change the deployment in accordance with the key performance indicator (KPI) and the environment, which change momentarily.

To implement such a system, in WO 2011/074699 A1, there is disclosed a technology involving calculating a communication load between servers, and determining a data processing module so as to minimize a sum of the product of a processing load and a communication amount, to thereby achieve appropriate transmission/reception of data between the servers.

SUMMARY

As disclosed in WO 2011/074699 A1, there has already been a technology of changing a machine to which the data processing module is deployed based on the load by the data processing and the communication amount. However, when adaptation to the full value chain is considered, a system model is required to execute the data processing in multiple stages, to thereby aggregate data on the overall value chain. The data processing in multiple stages is not considered in WO 2011/074699 A1, and when the disclosed technology is used in the proposed system configured to execute the data collection and the analysis in the multiple stages, the optimization remains only partial. The technology is therefore required to be a deploy destination determination algorithm for achieving overall optimization by evaluating a cost of the system through data processing in a plurality of stages also in consideration of processing in subsequent stages.

An object of this invention is to determine a computer to which a data processing service is to be deployed and to dynamically change the computer in accordance with an operating environment thereof, which can be applied to the full value chain.

According to one aspect of the present invention, a service deployment control system includes a machine management module, a network management module, a service management module and a service deployment destination determination module. The machine management module is configured to acquire information on an operation of the service providing computer. The network management module is configured to acquire information on cooperation among a plurality of services. The service management module is configured to manage a condition for a computer resource that is set to and required for each of the services. the service deployment destination determination module is configured to select a service providing computer satisfying the condition for the computer resource required for the service out of the information on the operation as a candidate of a deployment destination of the service, generate combinations of the candidates as deployment patterns, calculate a deployment cost for each of the deployment patterns, select one of the deployment patterns having the minimum deployment cost, and determine the one of the selected deployment patterns as the deployment destination of the service.

According to at least one embodiment of this invention, in the service deployment control system configured to execute multi-stage data processing, it is possible to minimize a cost of deploying the data processing services in the entire system also in consideration of processing in subsequent stages.

The details of at least one embodiment of a subject matter disclosed herein are set forth in the accompanying drawings and the following description. Other features, aspects, and effects of the disclosed subject matter become apparent from the following disclosure, drawings, and claims.

BRIEF DESCRIPTION OF THE DRAWINGS

FIG. 3 is a table for showing an example of the machine operation state table according to the embodiment of this invention.

FIG. 4 is a table for showing an example of the delay time table according to the embodiment of this invention.

FIG. 5A is a table for showing an example of the communication amount information table according to the embodiment of this invention.

FIG. 5B is a table for showing an example of the communication amount information table according to the embodiment of this invention.

FIG. 6 is a table for showing an example of the service operation state table according to the embodiment of this invention.

FIG. 7 is a table for showing an example of the communication cost table according to the embodiment of this invention.

FIG. 8 is a table for showing an example of the deployment cost table according to the embodiment of this invention.

FIG. 9 is a table for showing a communication amount threshold value excess determination table according to the embodiment of this invention.

FIG. 14 is a table for showing an inter-data-processing-service communication amount information table according to the embodiment of this invention.

FIG. 15 is a table for showing a machine operation state table according to the embodiment of this invention.

FIG. 16 is a table for showing a communication cost table according to the embodiment of this invention.

FIG. 17 is a table for showing a service operation state table according to the embodiment of this invention.

FIG. 18 is a table for showing a delay time table according to the embodiment of this invention.

FIG. 19 is a table for showing a service operation state table according to the embodiment of this invention.

FIG. 22 is a table for showing a service operation state table according to the embodiment of this invention.

FIG. 23 is a table for showing an inter-data-processing-service communication amount information table according to the embodiment of this invention.

FIG. 24 is a table for showing a service operation state table according to the embodiment of this invention.

FIG. 26A is a table for showing an inter-service-deployment-machine communication amount information table according to the embodiment of this invention.

FIG. 26B is a table for showing an inter-service-deployment-machine communication amount information table according to the embodiment of this invention.

FIG. 26C is a table for showing an inter-service-deployment-machine communication amount information table according to the embodiment of this invention.

FIG. 27A is a table for showing a deployment cost table according to the embodiment of this invention.

FIG. 27B is a table for showing a deployment cost table according to the embodiment of this invention.

FIG. 27C is a table for showing a deployment cost table according to the embodiment of this invention.

DETAILED DESCRIPTION OF THE PREFERRED EMBODIMENTS

Figure 1:
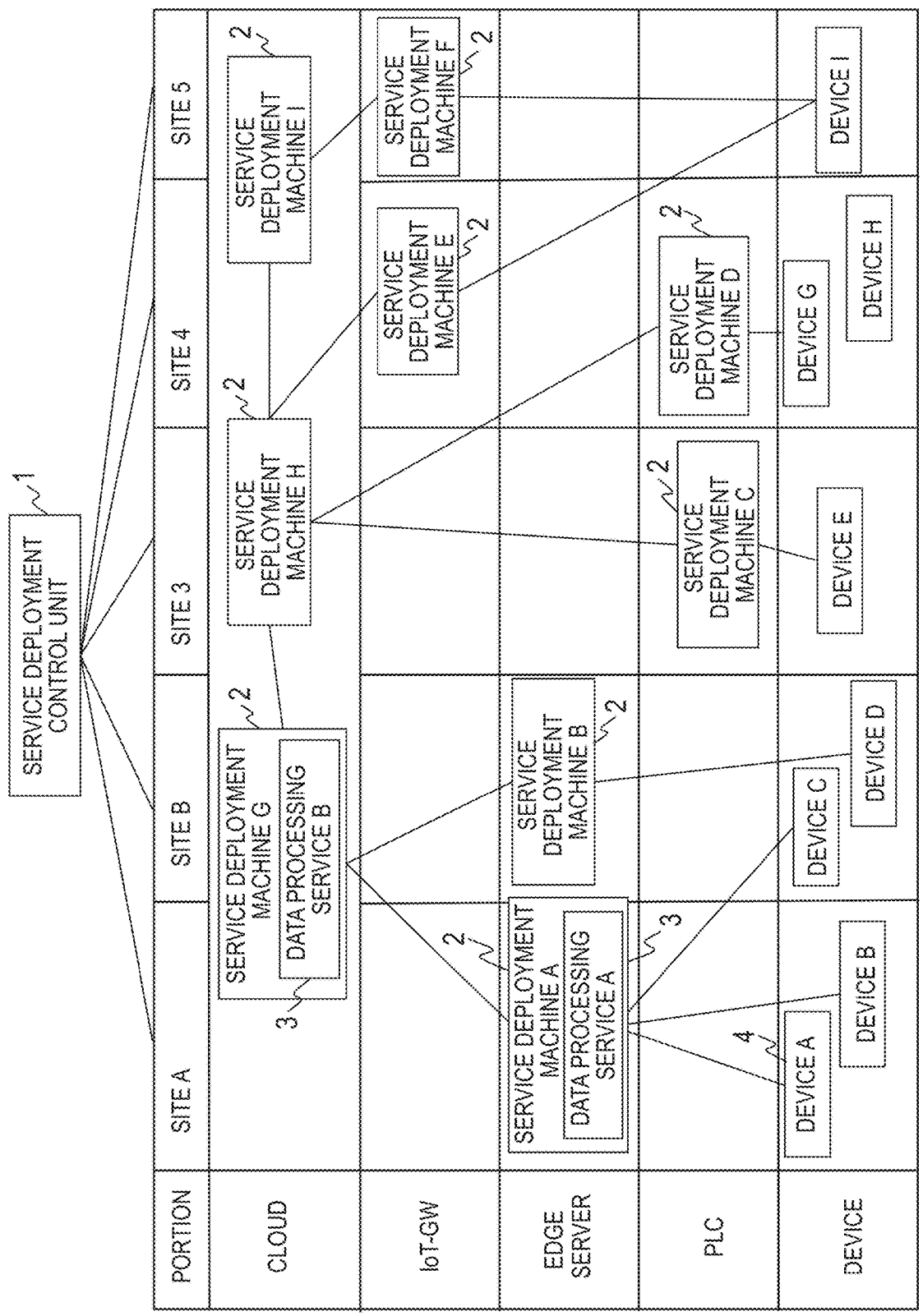
FIG. 1 is a diagram for illustrating an overall configuration of the service deployment control system according to an embodiment of this invention.

Referring to the drawings, a description is now given of a service deployment control system and service deployment control processing according to at least one embodiment of this invention.

<Data Processing>

FIG. 1 is a diagram for illustrating an overall configuration of the service deployment control system including a service deployment control unit (management computer) 1, which is a subject matter of this invention. Data generated by a device 4 at each site is collected to a service deployment machine 2, to which a data processing service 3, which is a data processing function such as data collection and data analysis, is deployed.

The service deployment machine 2 can be implemented in various forms such as a programmable logic controller (PLC), an edge server, an IoT-gateway (GW), and a cloud.

Data processing results obtained by the data processing service 3 are further collected to the data processing service 3 deployed to another service deployment machine 2 so as to execute data processing in multiple stages. The service deployment machine 2 serving as the data transmission destination from the respective devices 4 and the service deployment machine 2 is not required to be installed at the same site. The data processing in multiple stages refers to processing of data that is executed across layers configured in FIG. 1 in an order of the devices 4, the PLCs, the edge servers, IoT-GWs, and the clouds.

Figure 2A:
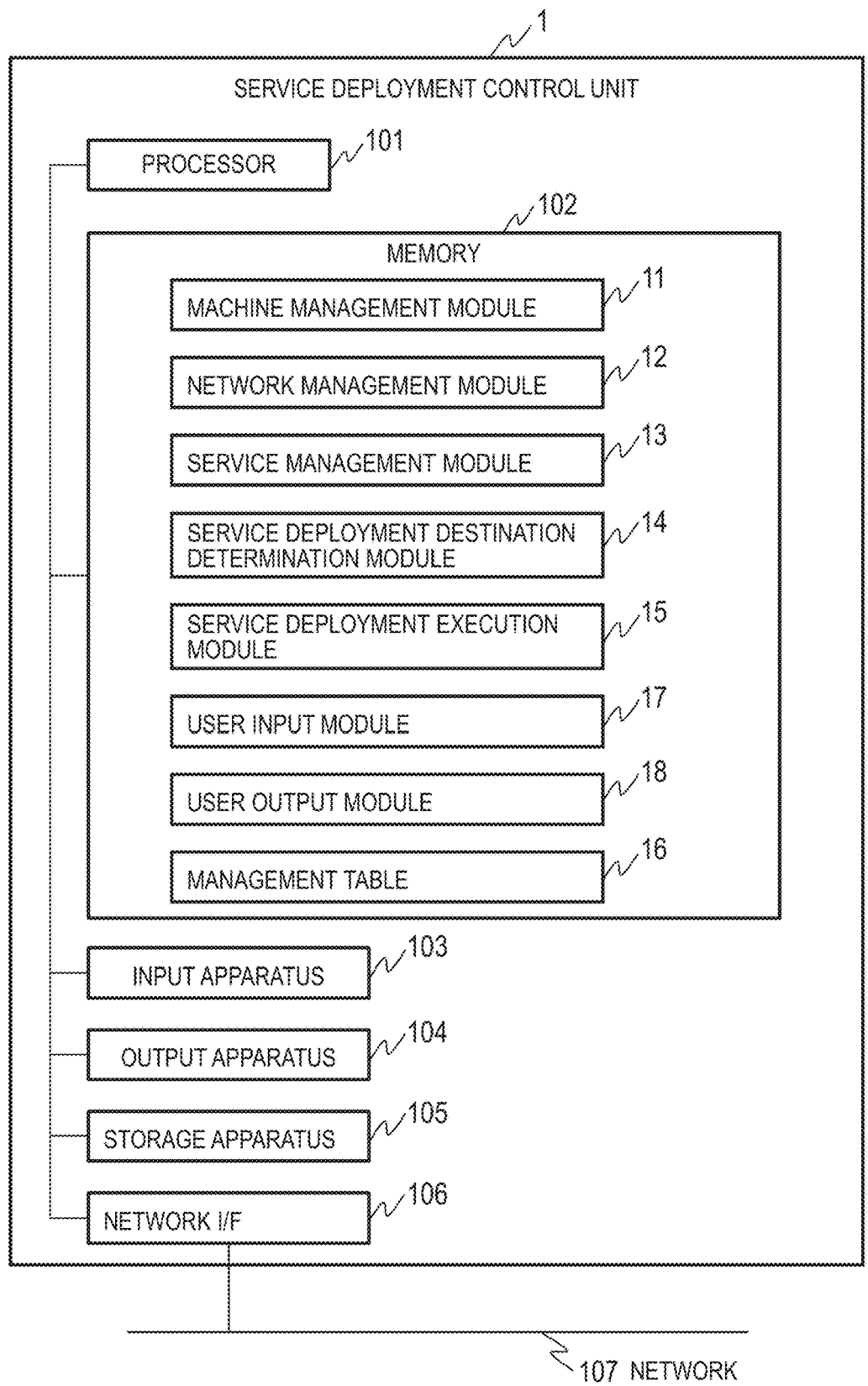
FIG. 2A is a block diagram for illustrating an example of a hardware configuration of the service deployment control unit according to the embodiment of this invention.

FIG. 2A is a block diagram for illustrating an example of a hardware configuration of the service deployment control unit 1. The service deployment control unit 1 is a computer including a processor 101, a memory 102, an input apparatus 103, an output apparatus 104, a storage apparatus 105, and a network interface 106.

A machine management module 11, a network management module 12, a service management module 13, a service deployment destination determination module 14, a service deployment execution module 15, a user input module 17, and a user output module 18 are loaded onto the memory 102, and are executed by the processor 101. Moreover, in the memory 102, information to be used by each of the function modules are stored in a management table 16.

The processor 101 operates as function modules configured to provide predetermined functions by executing processing in accordance with program files. For example, the processor 101 executes a machine managing program, to thereby function as the machine management module 11. The same applies to other program files. Further, the processor 101 also operates as function modules for providing respective functions of a plurality of pieces of processing to be executed by each program. The computer and the computer system are an apparatus and a system including those function modules.

The input apparatus 103 is formed of a mouse and a keyboard, or a touch panel. The output apparatus 104 is formed of a display. The storage apparatus 105 is formed of a non-volatile recording medium. The network interface 106 communicates to/from other service deployment machines 2 and the devices 4 through a network 107.

Figure 2B:
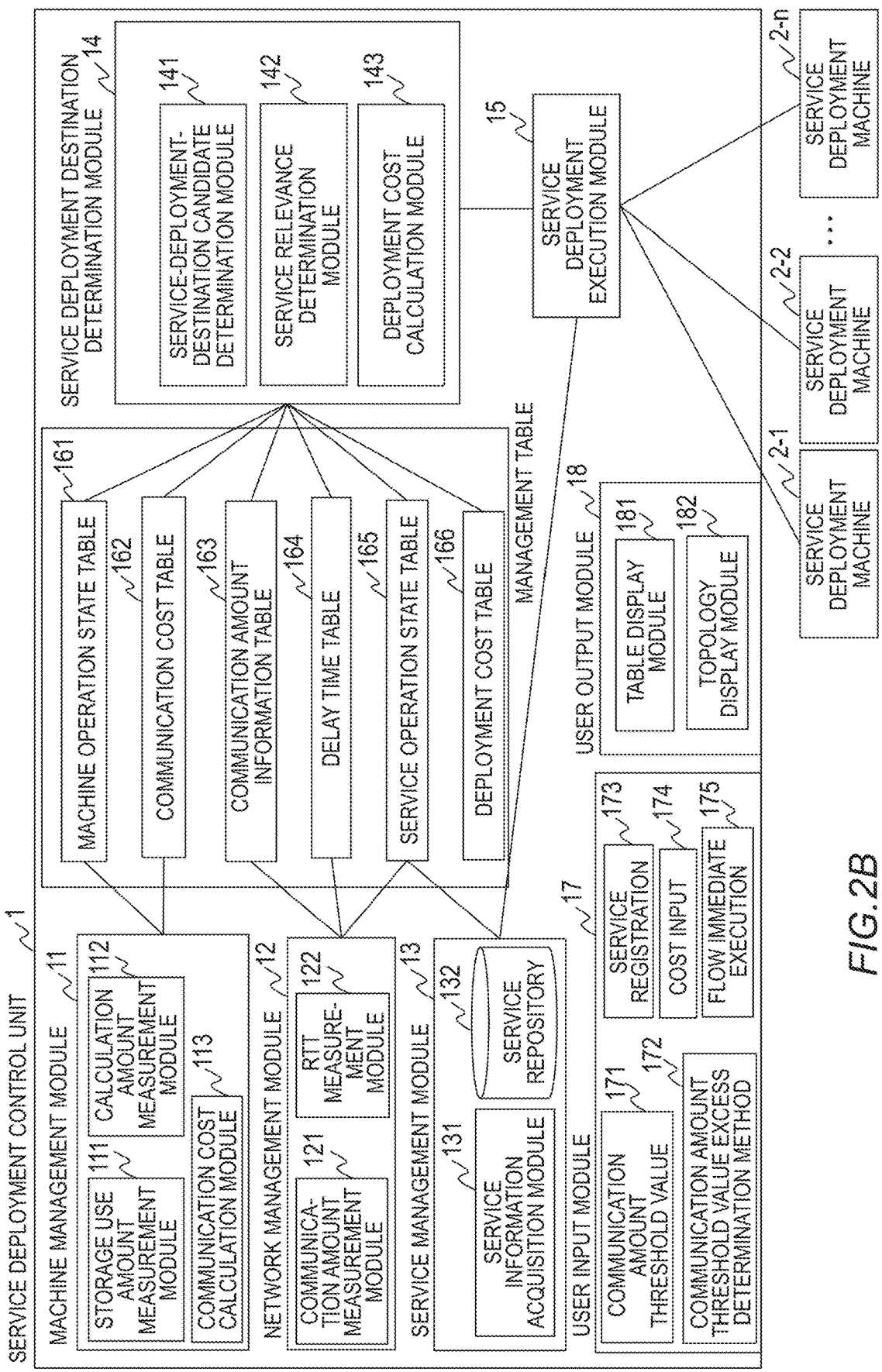
FIG. 2B is a diagram for illustrating an example of functions of the service deployment control unit according to the embodiment of this invention.

FIG. 2B is a diagram for illustrating an example of functions of the service deployment control unit 1. The machine management module 11 collects information on the service deployment machines 2, which is coupled to the service deployment control system to execute the services.

A storage use amount measurement module 111 and a calculation amount measurement module 112 forming the machine management module 11 measure a storage use amount and a calculation amount of each service deployment machine 2, respectively, and input the information to a machine operation state table 161. The measurements by the storage use amount measurement module 111 and the calculation amount measurement module 112 are executed at predetermined cycles. As the calculation amount, for example, the number of bytes per unit time processed by the service deployment machine 2 may be used.

A communication cost calculation module 113 calculates a communication cost between the service deployment machines 2 from the number of routers (the number of hops) between the service deployment machines 2 or a delay time, and input the communication cost to a communication cost table 162.

Regarding the communication cost, a value obtained by using a predetermined value so as to normalize the number of hops or the delay time between the service deployment machines 2 can be calculated as the communication cost. Moreover, regarding the communication cost, input to a cost input 174 described later may be used to update the communication cost table 162.

The service management module 13 includes a service information acquisition module 131 and a service repository 132. The service information acquisition module 131 updates a service operation state table 165 through the user input module 17. Moreover, an image file of the data processing service 3 is stored in the service repository 132.

The network management module 12 includes a communication amount measurement module 121 and a round-trip time (RTT) measurement module 122. The communication amount measurement module 121 measures a communication amount between the data processing services 3 deployed to the service deployment machines 2, and updates a communication amount information table 163. The RTT measurement module 122 measures an RTT from each device 4 to the service deployment machine 2. The measured value is input to a delay time table 164. As the communication amount, for example, a data amount (the number of bytes) per unit time may be used.

The service deployment destination determination module 14 includes a service-deployment-destination candidate determination module 141, a service relevance determination module 142, and a deployment cost calculation module 143. The service-deployment-destination candidate determination module 141 refers to the machine operation state table 161 and the delay time table 164 so as to determine which data processing service 3 can be deployed to which service deployment machine 2, and inputs a determination result to the service operation state table 165.

The service relevance determination module 142 refers to the communication amount information table 163, to thereby determine relevance between the data processing services 3. In at least one embodiment, the relevance is determined in accordance with an amount of communication in one way.

It should be noted that the relevance may be determined based on an index other than the one-way communication amount. The relevance may be determined based on the strength of a dependence relation between services estimated from, for example, details of a command, or the amount of transaction. Alternatively, the relevance can be determined from a distance between the data processing services 3 or a difference in layer between the data processing services 3.

The deployment cost calculation module 143 determines to which service deployment machine 2 the data processing service 3 is to be deployed, and calculates a deployment cost based on the information of the communication cost table 162. In at least one embodiment, the deployment cost is calculated by multiplying the communication amount by the communication cost. It should be noted that the deployment cost may be calculated through an index other than the product of the communication amount and the communication cost, and may be calculated in consideration of, for example, a cost for operation of the service deployment machine 2, or a cost for use of a storage.

The deployment cost calculation module 143 selects the service deployment machine 2 so as to minimize the deployment cost.

The service deployment execution module 15 acquires the data processing service 3 from the service repository 132 after the service deployment machine 2 to which the service is to be deployed is determined, and transmits the data processing service 3 to the specified service deployment machine 2.

The user input module 17 can receive inputs of a communication amount threshold value 171, a communication amount threshold value excess determination method 172, a service registration 173, the cost input 174, and a flow immediate execution 175 as described later. Moreover, the user output module 18 includes a table display module 181 and a topology display module 182 as described later.

<Tables>

The service deployment control unit 1 holds information on the service deployment machines 2 and the data processing services 3 as the management table 16. The management table 16 includes the machine operation state table 161, the communication cost table 162, the communication amount information table 163, the delay time table 164, the service operation state table 165, and the deployment cost table 166. A description is now given of each of the elements of the management table 16.

It should be noted that an example in which the management table 16 is stored in the memory 102 is described in at least one embodiment, but the storage of the management table 16 is not limited to this example, and a part or whole of the management table 16 may be stored in the storage apparatus 105.

FIG. 3 is a table for showing an example of the machine operation state table 161. The machine operation state table 161 contains a service deployment machine name 1610 of each service deployment machine 2, a storage remaining capacity 1611 of each service deployment machine 2, an available calculation amount 1612 of each service deployment machine 2, and a data processing service name 1613 operating on each service deployment machine 2 as one entry.

In at least one embodiment, the measured values of the storage use amount measurement module 111 and the calculation amount measurement module 112 are exemplified as normalized values. In the table of FIG. 3, "K" indicates 10 to the power of 3, "M" indicates 10 to the power of 6, "G" indicates 10 to the power of 9, and "T" indicates 10 to the power of 12, and the same applies to other tables. Moreover, the number of bytes per unit time is stored in the available calculation amount 1612.

FIG. 4 is a table for showing an example of the delay time table 164. The delay time table 164 includes a device name 1640 of the device 4 of a measurement target, a service deployment machine name 1641, and a delay time 1642 to be taken to each service deployment machine 2 in one entry.

In at least one embodiment, the delay time 1642 may be an instantaneous value measured by the RTT measurement module 122 or an average value in a predetermined period.

FIG. 5A and FIG. 5B are tables for showing an example of the communication amount information table 163. The communication amount information table 163 includes an inter-data-processing-service communication amount information table 163a of FIG. 5A and an inter-service-deployment-machine communication amount information table 163b of FIG. 5B.

Communication amount information for a pair of a transmission side and a reception side between the data processing services 3 is input to the inter-data-processing-service communication amount information table 163a of FIG. 5A. Moreover, a communication amount threshold value 1631 serving as an index to be used to determine presence or absence of relevance between the data processing services 3 is contained in the inter-data-processing-service communication amount information table 163a of FIG. 5A.

Communication amount information on a pair of a transmission side and a reception side between the service deployment machines 2 is input to the inter-service-deployment-machine communication amount information table 163b of FIG. 5B. The communication amount in the communication amount information table 163 may be an instantaneous value measured by the communication amount measurement module 121 or an average value in a predetermined period.

FIG. 6 is a table for showing an example of the service operation state table 165. The service operation state table 165 includes a data processing service name 1650, a required calculation amount 1651, a required storage capacity 1652, a permissible delay amount 1653, a deployment-available machine name 1654, a deployment destination machine name 1655, and a relevant data processing service name 1656 as one entry, which are input by the service information acquisition module 131.

The storage remaining capacity 1611 and the available calculation amount 1612 of the machine operation state table 161 and the delay time 1642 of the delay time table 164 are compared with the required calculation amount 1651, the required storage capacity 1652, and the permissible delay amount 1653 of the service operation state table 165, respectively, and service deployment machine names available for the deployment are input to the deployment-available machine name 1654.

The name of the service deployment machine 2 to which the service is actually deployed out of the names in the deployment-available machine name 1654 is input to the deployment destination machine name 1655. The data processing services 3 determined as being relevant (communication amount>communication amount threshold value 1631) by the service relevance determination module 142 are input to the relevant data processing service name 1656.

FIG. 7 is a table for showing an example of the communication cost table 162. A value of the communication cost between the service deployment machines 2 calculated by the communication cost calculation module 113 is input to the communication cost table 162. It is determined that the communication cost is higher as the value of the communication cost becomes larger. A value obtained by normalizing the calculated value by the communication cost calculation module 113 is exemplified in at least one embodiment.

FIG. 8 is a table for showing an example of the deployment cost table 166. The deployment cost between the service deployment machines 2 is stored in the deployment cost table 166. The deployment cost is calculated by multiplying the value of the inter-service-deployment-machine communication amount information table 163b and the value in the communication cost table 162 by each other. It is determined that the deployment cost is higher as the value of the deployment cost becomes larger.

<User Input Module>

The user input module 17 stores a value received from the input apparatus 103 in predetermined data. The value input to the communication amount threshold value 171 is reflected to the communication amount threshold value 1631. The communication amount threshold value 1631 is used to determine presence or absence of the relevance between the data processing services 3. As the threshold value becomes larger, the data processing services 3 are more likely to be determined to be relevant.

FIG. 9 is a table for showing a communication amount threshold value excess determination table 1721 to be selected in the communication amount threshold value excess determination method 172. In the communication amount threshold value excess determination table 1721, one entry is formed by a number 17211, which is an input value of the communication amount threshold value excess determination method 172, and a communication amount threshold value excess determination method name 17212 corresponding to the number 17211.

The "excess of instantaneous value" in an entry in which the number 17211 is "1" is a method of making a determination of "excess" when the value input to the inter-data-processing-service communication amount information table 163a shown in FIG. 5A exceeds the communication amount threshold value 1631.

The method "continuous n times of excess of instantaneous value" in an entry in which the number 17211 is "2" is a method of making the determination of "excess" when the value has been input to the inter-data-processing-service communication amount information table 163a n times, and all of the values that have been input n times exceed the communication amount threshold value 1631.

The method "n times of excess of average value" in an entry in which the number 17211 is "3" is a method of making the determination of "excess" when the value has been input to the inter-data-processing-service communication amount information table 163a n times, and an average value of the input values that have been input n times exceeds the communication amount threshold value 1631.

The method "n times of excess of maximum value" in an entry in which the number 17211 is "4" is a method of making the determination of "excess" when the value has been input to the inter-data-processing-service communication amount information table 163a n times, and a maximum value of the input values that have been input n times exceeds the communication amount threshold value 1631.

The method "user definition" in an entry in which the number 17211 is "5" enables another communication amount threshold value excess determination method to be set. One of the five communication amount threshold value excess determination methods is selected to be input as the communication amount threshold value excess determination method 172.

The service registration 173 registers the data processing service 3 to be executed. A user of the service deployment control unit 1 inputs a name of the data processing service 3, a delay time permitted between the data processing service 3 and the device 4, and a required calculation amount and a required storage capacity used by the data processing service 3, and input values are reflected to the service operation state table 165. In the service registration 173, a program required in order to operate the data processing service 3 is registered, to thereby store the corresponding program in the service repository 132.

The cost input 174 receives the communication cost between the service deployment machines 2. The cost input 174 is automatically input in advance by the communication cost calculation module 113, but may be corrected to a predetermined value. The input value in this case is reflected to the communication cost table 162.

In the flow immediate execution 175, processing (flow) to be periodically executed can immediately be started.

<User Output Module>

In the table display module 181, the management table 16 generated by the service deployment control unit 1 can be displayed on the output apparatus 104.

Figure 10:
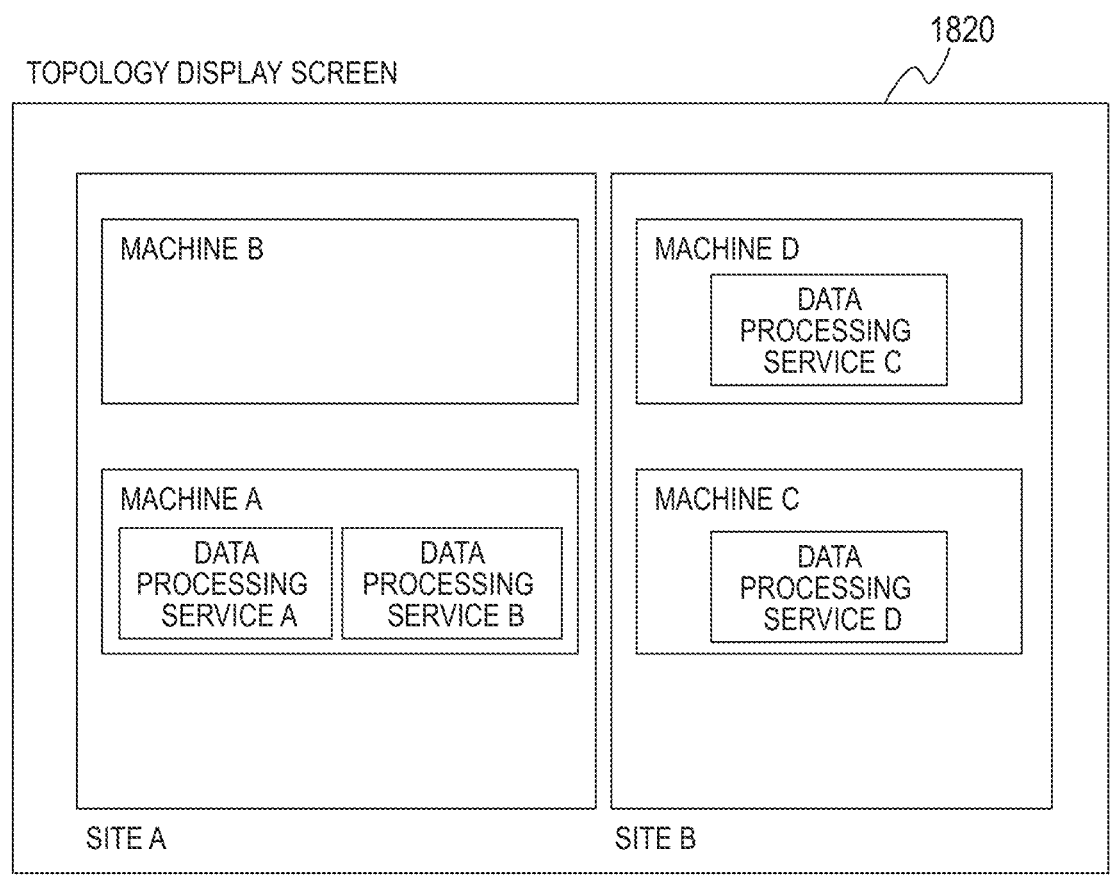
FIG. 10 is a diagram for illustrating an example of a topology display screen 1820 generated by the topology display module 182 according to the embodiment of this invention.

In the topology display module 182, a correspondence relationship in which data processing service 3 is deployed to which service deployment machine 2 can be displayed on the output apparatus 104. FIG. 10 is a diagram for illustrating an example of a topology display screen 1820 generated by the topology display module 182.

The names of the service deployment machines 2 and the names of the operating data processing services 3 are displayed on the topology display screen 1820. In the example illustrated in FIG. 10, it is displayed that data processing services A and B are operating on a machine (service deployment machine 2) A at a site A.

<Details of Processing>

Figure 11:
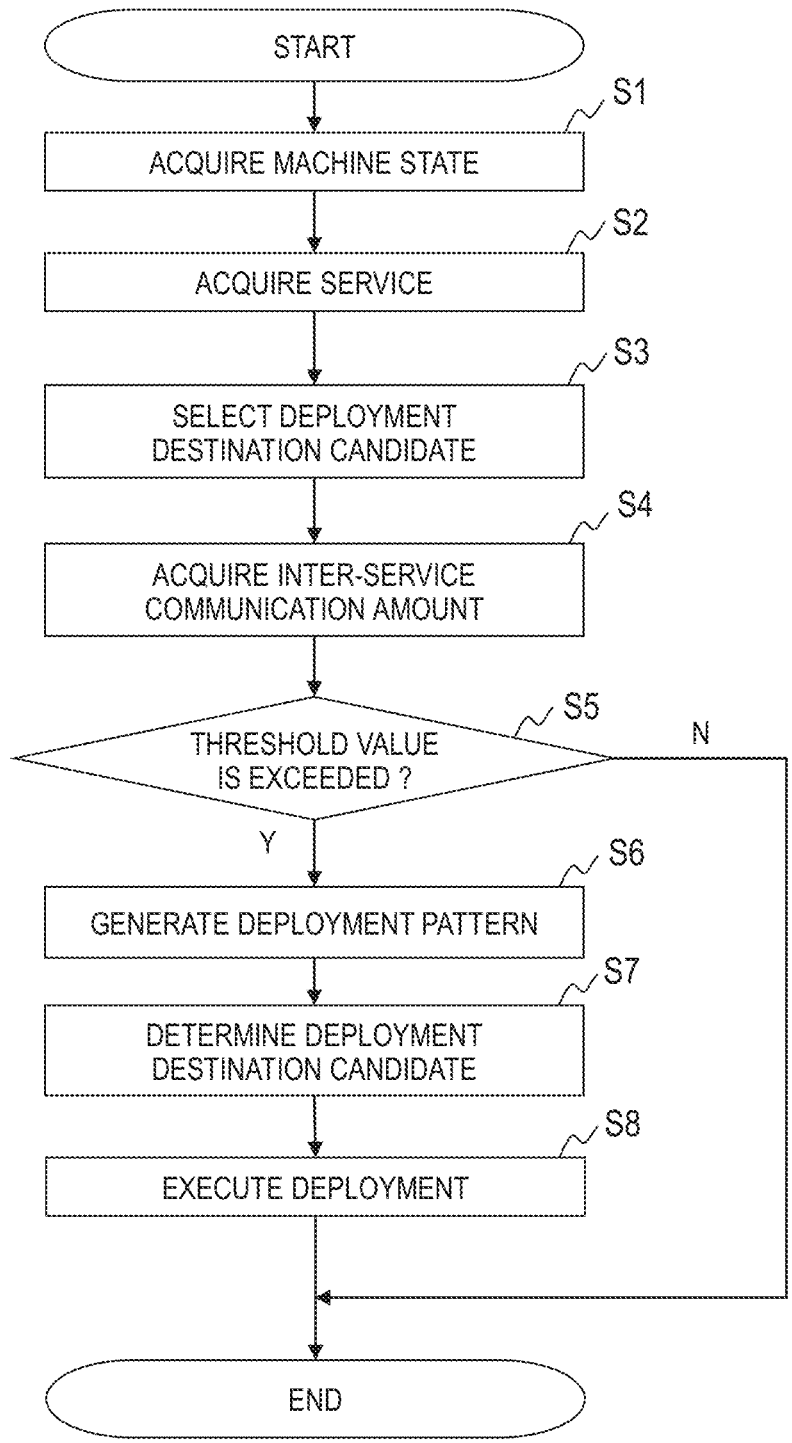
FIG. 11 is a flowchart for illustrating an example of processing to be executed in the service deployment control unit according to the embodiment of this invention.

FIG. 11 is a flowchart for illustrating an example of processing to be executed in the service deployment control unit 1. This processing may be executed at predetermined cycles, or at a predetermined timing specified by the user of the service deployment control unit 1.

In Step S1, the service deployment control unit 1 acquires operation states of the service deployment machines 2. When the storage remaining capacity 1611 and the available calculation amount 1612 are used as an index of the operation state, the storage use amount measurement module 111 and the calculation amount measurement module 112 acquire the storage remaining capacity 1611 and the available calculation amount 1612, respectively, and input the acquired storage remaining capacity and available calculation amount to the machine operation state table 161.

In this case, when the storage remaining capacity 1611 and the available calculation amount 1612 are smaller than predetermined values, this service deployment machine 2 may be set to be "unavailable". As the index of the operation state of the service deployment machine 2, a physical location of the service deployment machine 2, a cost required for the operation of the service deployment machine 2, or the like may be used. In Step S1, the input to the communication cost table 162 is further executed by the communication cost calculation module 113.

In Step S2, the service information acquisition module 131 acquires the required calculation amount 1651, the required storage capacity 1652, and the permissible delay amount 1653 from the service registration 173 of the user input module 17, and inputs those amounts to the service operation state table 165. When the required calculation amount 1651, the required storage capacity 1652, and the permissible delay amount 1653 for each data processing service 3 are fixed values, those amounts may be acquired from a file set in advance or the like.

In Step S3, the service-deployment-destination candidate determination module 141 of the service deployment destination determination module 14 selects candidates of the deployment destination of the data processing services 3 from the service deployment machines 2.

When the service-deployment-destination candidate determination module 141 selects the service deployment machine 2 as the deployment destination candidate, and the delay time is a constraint, the service-deployment-destination-candidate determination module 141 uses the RTT measurement module 122 so as to acquire the delay time 1642 between the device 4 and the service deployment machine 2, to thereby update the delay time table 164.

Then, the service-deployment-destination candidate determination module 141 refers to the machine operation state table 161 and the delay time table 164, and inputs the service deployment machines 2 satisfying the condition to the deployment-available machine name 1654 of the service operation state table 165 as candidates to which the data processing service 3 can be deployed. As the index to be used by the service deployment destination determination module 14 to select the service deployment machines 2 as the candidates of the deployment destinations, the cost for the operation, the number of communication hops between the device 4 and the service deployment machine 2, or the like may be used.

In Step S4, the service relevance determination module 142 of the service deployment destination determination module 14 determines the relevance between the data processing services 3. When the communication amount is used as an index of the relevance between the data processing services 3, the communication amount measurement module 121 measures an inter-service communication amount and an inter-service-deployment-machine communication amount. Then, the communication amount measurement module 121 inputs the inter-service communication amount and the inter-service-deployment-machine communication amount to the communication amount information table 163 (the inter-data-processing-service communication amount information table 163a and the inter-service-deployment-machine communication amount information table 163b).

In Step S5, the service relevance determination module 142 refers to the inter-data-processing-service communication amount information table 163a, to thereby determine the relevance between the data processing services 3. When the communication amount is used as the index of the relevance between the data processing services 3, the service relevance determination module 142 compares the inter-service communication amount with the communication amount threshold value 1631.

The service relevance determination module 142 determines that the relevance of a combination of the data processing services 3 whose communication amount exceeds the communication amount threshold value 1631 is high. When it is determined that the relevance between the data processing services 3 is high based on the communication amount threshold value excess determination method 172, the service relevance determination module 142 inputs the names of the data processing services 3 to the relevant data processing service name 1656 of the service operation state table 165, and the processing proceeds to Step S6. When it is not determined that the relevance is higher than the threshold value, the processing is finished.

In Step S6, in order to execute preliminary setting (unification) of the service deployment machines 2 to which the data processing services 3 are deployed, the deployment cost calculation module 143 preliminarily determines service deployment machines 2 serving as candidates of the deployment destinations of the data processing services 3, and sets one or more deployment patterns. Then, the deployment cost calculation module 143 multiplies the value of the inter-service-deployment-machine communication amount information table 163b and the value of the communication cost table 162 by each other so as to generate the deployment cost table 166.

The setting of the deployment patterns may be executed, for example, as described below. The deployment cost calculation module 143 acquires conditions of computer resources required for each of the data processing services 3 set to the service operation state table 165. The conditions of the required computer resources are, for example, the required calculation amount 1651, the required storage capacity 1652, and the permissible delay amount 1653.

Then, the deployment cost calculation module 143 refers to the machine operation state table 161 and the delay time table 164 so as to store identifiers (or names) of the service deployment machines 2 that can execute each data processing service 3 in the deployment-available machine name 1654. A plurality of identifiers can be stored in the deployment-available machine name 1654.

Then, the deployment cost calculation module 143 generates one or more combinations of the identifiers of the service deployment machines 2 having the deployment-available machine name 1654 as deployment patterns. The deployment patterns to be generated may be all combinations of the deployment-available machine names 1654 of the respective data processing services 3.

In Step S7, the deployment cost calculation module 143 compares costs of the respective deployment destinations (deployment patterns) of the data processing services 3 generated in Step S6 with one another, to thereby determine a deployment pattern having the minimum deployment cost in terms of the entire service deployment control system.

Then, in Step S8, the service deployment execution module 15 deploys the data processing services 3 acquired from the service repository 132 to the service deployment machines 2 in the determined deployment pattern.

As a result of the above-mentioned processing, in the service deployment control system configured to execute the multi-stage data processing service, the service deployment control unit 1 can minimize the deployment cost of the data processing services in terms of the entire service deployment control system also in consideration of processing in subsequent stages.

A description is given of an example of the processing by using a specific example.

Example of Changing Deployment of Data Processing Services

Figure 12:
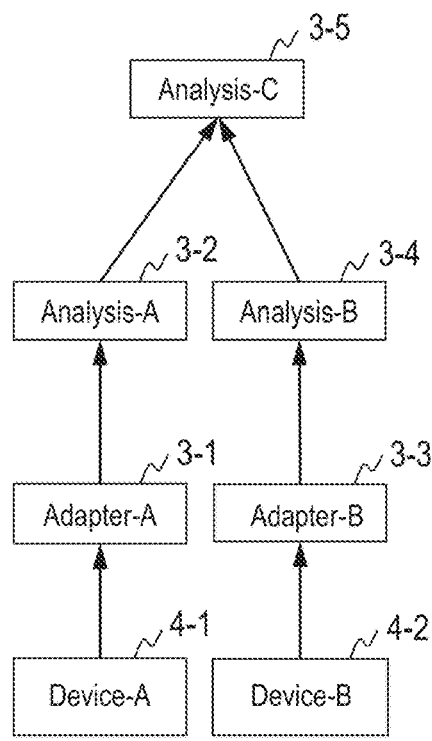
FIG. 12 is a diagram for illustrating an overview of the service deployment control system according to the embodiment of this invention.

FIG. 12 is a diagram for illustrating an overview of the service deployment control system in a case where the deployment of the data processing services 3 is changed. Device-A 4-1 transmits data to a data processing service (Analysis-C) 3-5 through a data processing service (Adapter-A) 3-1 and a data processing service (Analysis-A) 3-2.

Device-B 4-2 transmits data to the data processing service (Analysis-C) 3-5 through a data processing service (Adapter-B) 3-3 and a data processing service (Analysis-B) 3-4.

Figure 13:
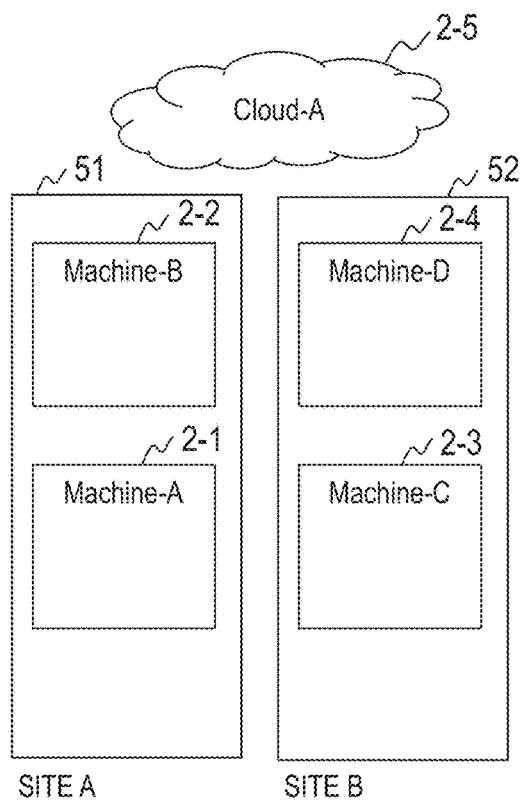
FIG. 13 is a diagram for illustrating an example of the service deployment machines according to the embodiment of this invention.

FIG. 13 is a diagram for illustrating an example of the service deployment machines 2 available for the service deployment control system of FIG. 12. A service deployment machine (Machine-A) 2-1 and a service deployment machine (Machine-B) 2-2 exist in a site A 51. A service deployment machine (Machine-C) 2-3 and a service deployment machine (Machine-D) 2-4 exist in a site B 52. Further, an available service deployment machine (Cloud-A) 2-5 exists on a cloud.

An inter-data-processing-service communication amount information table 163a-1 of FIG. 14 is the inter-data-processing-service communication amount information table 163 before the processing of Step S1 of FIG. 11 is executed. The data processing services 3 are not deployed, and hence the table is empty. The value "1 K" is input to the communication amount threshold value 1631-1 by the communication amount threshold value 171.

A machine operation state table 161-1 of FIG. 15 is the machine operation state table 161 after the processing of Step S1 has been executed. In the example shown in FIG. 15, the storage remaining capacities 1611-1 and the available calculation amounts 1612-1 are input.

A communication cost table 162-1 of FIG. 16 is the communication cost table 162 after the processing of Step S1 has been executed.

A service operation state table 165-1 of FIG. 17 is the service operation state table 165 after the processing of Step S2 has been executed. In the example shown in FIG. 17, the required calculation amount 1651-1, the required storage capacity 1652-1, and the permissible delay amount 1653-1 are input.

A delay time table 164-1 of FIG. 18 is the delay time table 164 after when the processing of Step S2 has been executed. The delay times 1642-1 are input by the RTT measurement module 122.

A service operation state table 165-2 of FIG. 19 is the service operation state table 165 after the processing of Step S3 has been executed.

The service deployment destination determination module 14 refers to the machine operation state table 161-1 after the processing of Step S1 has been executed and the delay time table 164-1 after the processing of Step S3 has been executed. Then, the service deployment destination determination module 14 inputs the service deployment machines 2 satisfying all the conditions of the required calculation amount 1651-2, the required storage capacity 1652-2, and the permissible delay amount 1653-2 of the service operation state table 165 to the deployment-available machine name 1654-2.

For example, the data processing service (Analysis-B) 3-3, the data processing service (Analysis-B) 3-4, and the data processing service (Analysis-C) 3-5 have the required calculation amounts 1651-2 of "100 K", and hence cannot be deployed to the service deployment machine (Machine-A) 2-1 and the service deployment machine (Machine-C) 2-3.

The data processing service (Adapter-A) 3-1 has the permissible delay amount 1653-2 of "20 ms (milliseconds)", and is thus required to be deployed to the service deployment machine (Machine-A) 2-1.

The storage remaining capacity 1611-1 of any service deployment machine 2 exceeds the required storage capacity 1652-2, and hence any service deployment machine 2 satisfies the condition. The service deployment destination determination module 14 executes a preliminary deployment so as to satisfy the deployment-available machine names 1654-2 in this state. In at least one embodiment, when the service deployment machines 2 are not uniquely determined under the conditions of the deployment-available machine names 1654-2, it is assumed that the service deployment destination determination module 14 randomly executes the deployment.

Figures 20, 21:
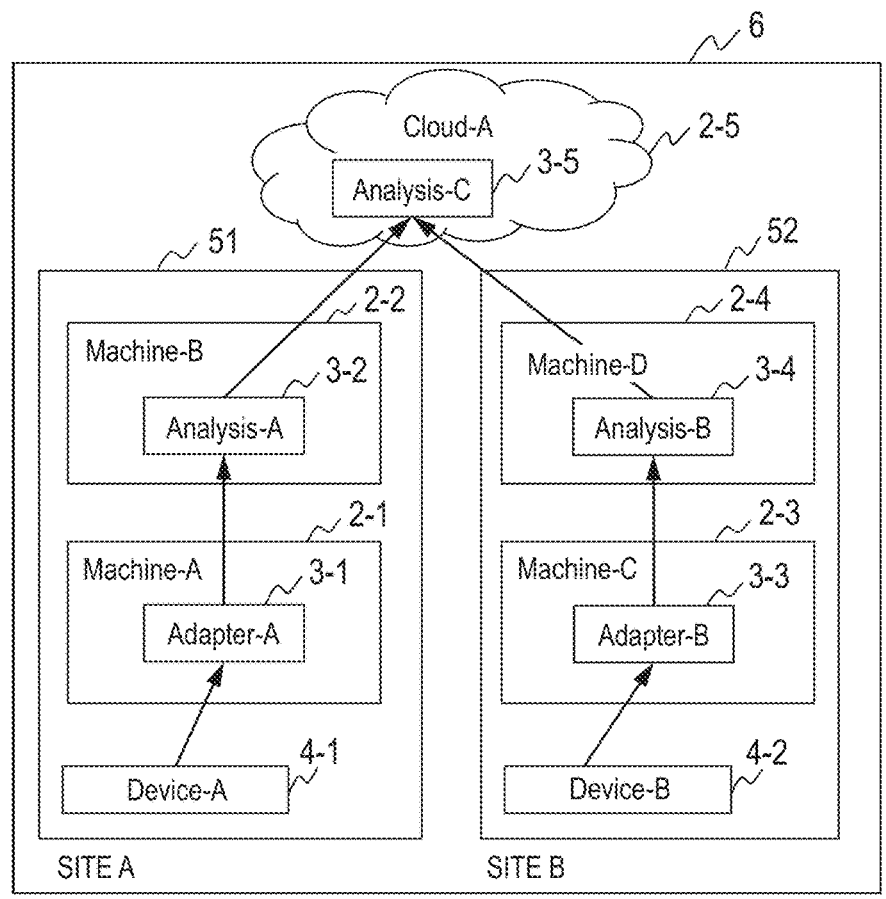
FIG. 20 is a diagram for illustrating the service deployment machines according to the embodiment of this invention.
FIG. 21 is a table for showing a machine operation state table according to the embodiment of this invention.

FIG. 20 is a diagram for illustrating the service deployment machines 2 to which the data processing services 3 have been preliminarily deployed in at least one embodiment. FIG. 21 and FIG. 22 are a machine operation state table 161-2 and a service operation state table 165-3 after the service deployment machines 2 have been preliminarily deployed (deployment pattern) as in FIG. 20.

The preliminary deployment may be executed by the service deployment destination determination module 14 in accordance with the amount of the required calculation amounts 1651-2 and the required storage capacities 1652-2 as long as the conditions of the deployment-available machine names 1654-2 are satisfied.

Then, in FIG. 11, the processing of Step S4 is executed. In at least one embodiment, as the index for measuring the relevance between the data processing services 3, the inter-service communication amount is used. As described above, as the index for measuring the relevance between the data processing services 3, similarity of commands executed on the data processing services 3 or the amount of transaction may be used.

An inter-data-processing-service communication amount information table 163a-2 of FIG. 23 is the inter-data-processing-service communication amount information table 163a after the processing of Step S4 has been executed.

In Step S5, the inter-data-processing-service communication amount information table 163a-2 and a communication amount threshold value 1631-2 are compared with each other by the service relevance determination module 142. When the "excess of instantaneous value" is selected in the communication amount threshold value excess determination method 172, as the value exceeding "1 K" set in the communication amount threshold value 1631-2, the data processing service (Adapter-A) 3-1 and the data processing service (Adapter-B) 3-3, the data processing service (Adapter-B) 3-3 and the data processing service (Analysis-B) 3-4, the data processing service (Analysis-A) 3-2 and the data processing service (Analysis-C) 3-5, and the data processing service (Analysis-B) 3-4 and the data processing service (Analysis-C) 3-5 are determined to be relevant by the service relevance determination module 142.

A service operation state table 165-4 of FIG. 24 is a table for showing the state in which the data processing services 3 determined to be relevant in Step S5 are input to the service operation state table 165. Then, the flowchart of FIG. 11 proceeds to Step S6, in which the data processing services 3 determined to be relevant services 1656-4 are deployed to the same service deployment machines 2.

Figure 25A:
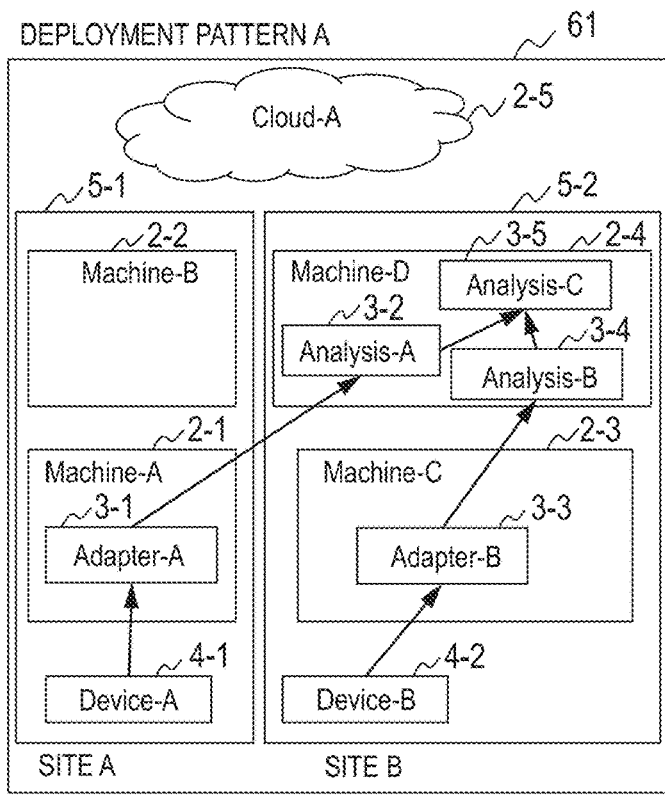
FIG. 25A is diagrams for illustrating deployment pattern A according to the embodiment of this invention.
Figure 25B:
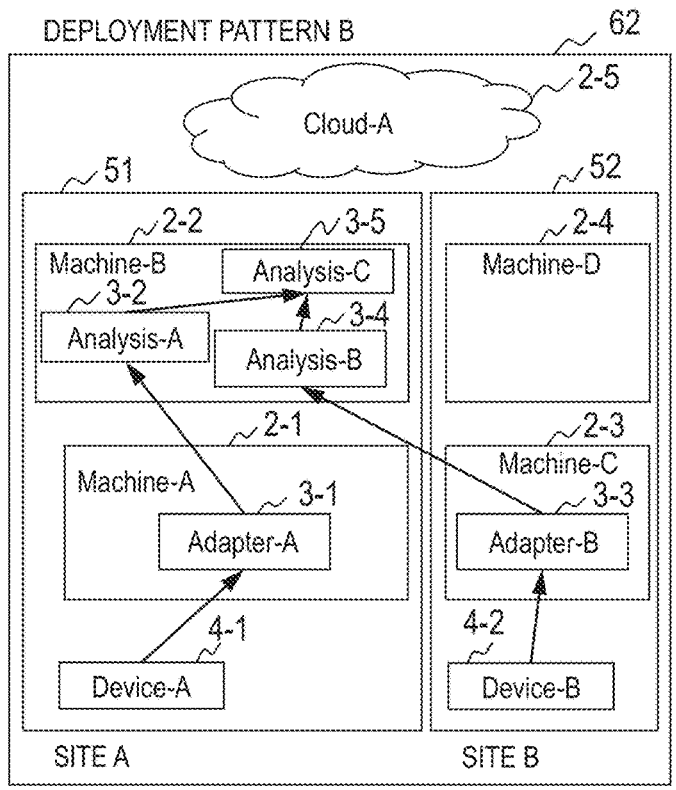
FIG. 25B is diagrams for illustrating deployment pattern B according to the embodiment of this invention.
Figure 25C:
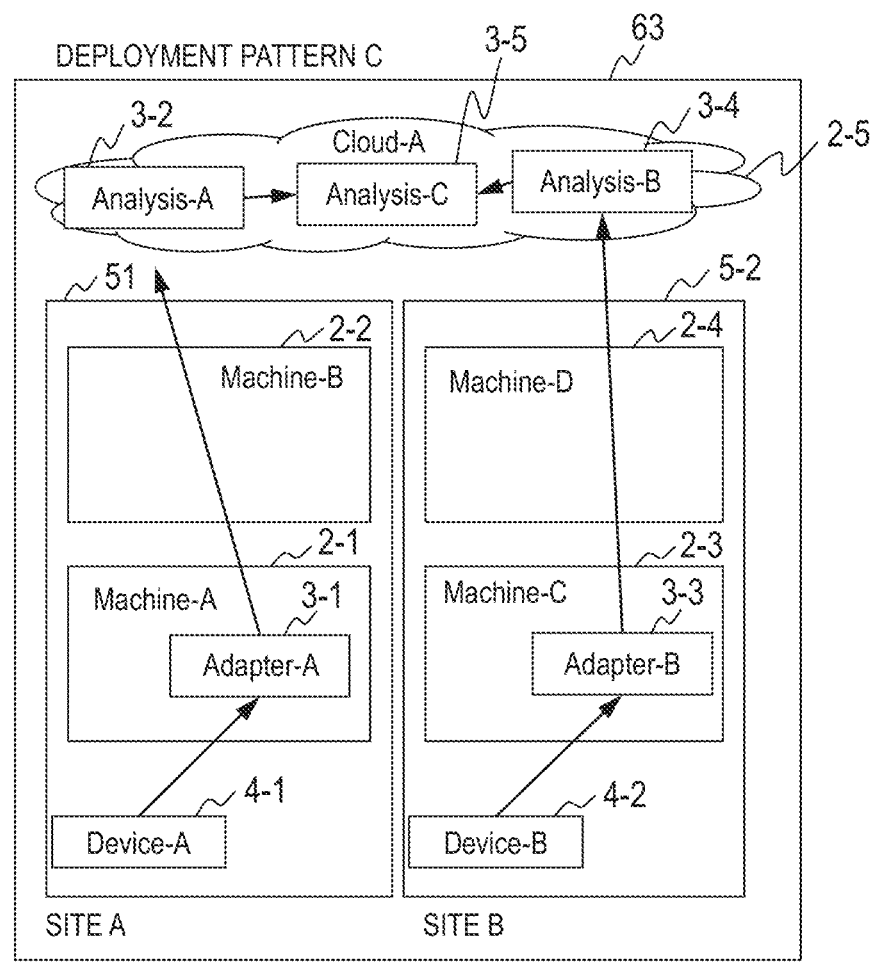
FIG. 25C is diagrams for illustrating deployment pattern C according to the embodiment of this invention.

FIG. 25A, FIG. 25B, and FIG. 25C are diagrams for illustrating deployment examples of the data processing services 3 preliminarily determined in Step S6. A deployment pattern A 61 of FIG. 25A indicates aggregation of the data processing service (Analysis-A) 3-2, the data processing service (Analysis-B) 3-4, and the data processing service (Analysis-C) 3-5 to the service deployment machine (Machine-D) 2-4. A deployment pattern B 62 of FIG. 25B indicates the aggregation of the data processing services to the service deployment machine (Machine-B) 2-2. A deployment pattern C 63 of FIG. 25C indicates the aggregation of the data processing services to the service deployment machine 2 (Cloud-A 2-5).

The service deployment machines 2 of the data processing service (Adapter-A) 3-1 and the data processing service (Adapter-B) 3-3 cannot be changed as indicated by the input to the deployment-available machine names 1654-4 of the service operation state table 165-4.

FIG. 26A, FIG. 26B, and FIG. 26C are an inter-service-deployment-machine communication amount information table 163b-1A, an inter-service-deployment-machine communication amount information table 163b-1B, and an inter-service-deployment-machine communication amount information table 163b-1C, respectively.

The inter-service-deployment-machine communication amount information table 163b-1A, the inter-service-deployment-machine communication amount information table 163b-1B, and the inter-service-deployment-machine communication amount information table 163b-1C are the inter-service-deployment-machine communication amount information tables 163b after the data processing services 3 have been deployed to the service deployment machines 2 in accordance with the deployment pattern A 61, the deployment pattern B 62, and the deployment pattern C 63, respectively, which are generated in Step S6.

A deployment cost table 166-1A, a deployment cost table 166-1B, and a deployment cost table 166-1C shown in FIG. 27A, FIG. 27B, and FIG. 27C respectively, are the deployment cost tables 166 after the data processing services 3 have been deployed to the service deployment machines 2 in accordance with the deployment pattern A 61, the deployment pattern B 62, and the deployment pattern C 63, respectively.

The deployment cost table 166 is generated through use of the inter-service-deployment-machine communication amount information table 163b-1A, the inter-service-deployment-machine communication amount information table 163b-1B, the inter-service-deployment-machine communication amount information table 163b-1C, and the communication cost table 162-1.

When sums of the costs of the tables are calculated, the sum of the inter-service-deployment-machine communication amount information table 163b-1A of FIG. 27A is approximately 24 M. The sum of the inter-service-deployment-machine communication amount information table 163b-1B of FIG. 27B is approximately 42 M. The sum of the inter-service-deployment-machine communication amount information table 163b-1C of FIG. 27C is approximately 600 M.

The inter-service-deployment-machine communication amount information table 163b-1A has the minimum cost, and the deployment cost calculation module 143 thus determines that the deployment in accordance with the deployment pattern A 61 has the minimum cost. Then, the service deployment execution module 15 deploys the data processing services 3 to the service deployment machines 2 in accordance with the deployment pattern A 61 illustrated in FIG. 25A.

In at least one embodiment, the data processing services 3 can be deployed to the service deployment machines 2 so as to minimize the deployment cost.

Modification Example of Processing of Changing Deployment of Data Processing Services As the flowchart illustrated in FIG. 11 is repeatedly executed, the data processing services 3 may increase or decrease and the service deployment machines 2 may increase or decrease. The rows of the management table 16 increase or decrease by executing again the flowchart of FIG. 11 when the increase or the decrease occurs, and effects equivalent to those of at least one embodiment are provided.

As described above, the service deployment control unit 1 in at least one embodiment acquires the information (the machine operation state table 161 and the communication cost table 162) on the operations of the service deployment machines 2, and acquires the information (the communication amount information table 163 and the delay time table 164) on the cooperation between the data processing services 3. Then, the service providing control module 1 acquires the conditions (the service operation state table 165) required by the computer resources set to each data processing service 3, and selects the service deployment machines 2 whose information on the operation satisfies the conditions of the computer resources required for the services as the candidates of the deployment.

Then, the service deployment control unit 1 generates the combinations of the candidates of the deployment destinations as the deployment patterns, calculates the deployment cost for each of the deployment patterns, and selects the deployment pattern having the minimum deployment cost. The service deployment control unit 1 deploys the data processing services 3 to the service deployment machines 2 having the selected deployment pattern, to thereby be able to achieve the determination of the service deployment machines 2 to which the data processing services are to be deployed, and the dynamic change in accordance with the operation environment of the computers.

Moreover, the service deployment control unit 1 stores the combination having a high relevance between the data processing services 3 in the relevant data processing service name 165b of the service operation state table 165, to thereby be able to select the service deployment machine 2 to which the data processing services 3 are to be deployed so as to reduce the communication cost between the data processing services 3 highly relevant to each other.

As a result, the service deployment control unit 1 can optimize the layers of the service deployment machines 2 that provide the data processing services 3 while maintaining the dependence relations between the data processing services 3.

Moreover, the service deployment control unit 1 can optimize cooperation among the hierarchical data processing services 3 such as the devices 4, which output data, the service deployment machines 2, which provide the data processing services 3 as edge servers and process the data of the devices 4, and the service deployment machines 2, which provide the data processing services 3 in a form of a cloud, which further processes the data processed by the edge servers.

Moreover, in at least one embodiment, a description is given of the example in which the machine management module 11, the network management module 12, the service management module 13, and the service deployment destination determination module 14 are provided by one computer, but the configuration is not limited to this example. The machine management module 11, the network management module 12, the service management module 13, and the service deployment destination determination module 14 may be implemented by computers different from one another.

CONCLUSION

The service deployment control unit 1 in at least one embodiment described above may be configured as described below.

(1) There is provided a service deployment control system, which includes a processor (101) and a memory (102), and is configured to control a service (the data processing service 3) to be deployed to a service providing computer (the service deployment machine 2), which is coupled through a network (107), the service deployment control system including: a machine management module (11) configured to acquire information (the machine operation state table 161, the communication cost table 162) on an operation of the service providing computer (2); a network management module (12) configured to acquire information (the communication amount information table 163, the delay time table 164) on cooperation among a plurality of services (3); a service management module (13) configured to manage a condition (the service operation state table 165) for a computer resource set to and required for each of the services (3); and a service deployment destination determination module (14) configured to select a service providing computer (2) satisfying the condition (165) for the computer resource required for the service (3) out of the information (161, 162) on the operation as a candidate of a deployment destination of the service (3), generate combinations of the candidates as deployment patterns (61 to 63), calculate a deployment cost (the deployment cost table 166) for each of the deployment patterns (61 to 63), select one of the deployment patterns (61 to 63) having the minimum deployment cost (166), and determine the one of the selected deployment patterns (61 to 63) as the deployment destination of the service (3).

According to the above-mentioned configuration, the service deployment control unit 1 generates the combinations of the candidates of the deployment destinations as the deployment patterns 61 to 63, calculates the deployment cost for each of the deployment patterns 61 to 63, and selects the deployment pattern having the minimum deployment cost. Then, the service deployment control unit 1 deploys the data processing services 3 to the service deployment machines 2 having the selected deployment pattern, to thereby be able to achieve the determination of the service deployment machines 2 to which the data processing services 3 are to be deployed, and the dynamic change in accordance with the operation environment of the computers.

(2) In the service deployment control system according to the above-mentioned item (1), the machine management module (11) is configured to acquire an operation state of the service providing computer (2) as the information (161, 162) on the operation, and the service deployment destination determination module (14) is configured to select the service providing computer (2) having the operation state satisfying the condition for the computer resource (165) required for the service (3) as the candidate of the deployment destination of the service (3).

According to the above-mentioned configuration, the service deployment control unit 1 can dynamically change the service deployment machines 2 to which the data processing services 3 are to be deployed in accordance with the operation states of the service deployment machines 2.

(3) In the service deployment control system according to the above-mentioned item (2), the machine management module (11) is configured to acquire one of delay times (163) of a device (4) coupled to the service providing computer (2) and a service providing computer (2) coupled to the service providing computer (2), a physical location of the service providing computer (2), and a cost required for the operation of the service providing computer (2), and store the one of the delay times, the physical location, and the cost as the information (161, 162) on the operation.

According to the above-mentioned configuration, the coupling relationships of the service deployment machine 2 to the device 4 or other service deployment machine 2 are held as the information on the operation, and the service deployment control unit 1 can optimize the layers of the service deployment machines 2 that provide the data processing services 3 while maintaining the dependence relation between the data processing services 3.

(4) In the service deployment control system according to the above-mentioned item (1), the network management module (12) is configured to acquire one of a communication amount (163) between the services (3), a transaction amount between the services (3), and details of a command between the services (3), and store the one of the communication amount, the transaction amount, and the details of the command as the information (163, 164) on the cooperation among the plurality of services (3).

According to the above-mentioned configuration, a relationship between the data processing services 3 is held as the information on the cooperation between the services, and the service deployment control unit 1 can thus optimize the layers of the service deployment machines 2 that provide the data processing services 3 while maintaining the dependence relation between the data processing services 3.

(5) In the service deployment control system according to the above-mentioned item (4), the service deployment destination determination module (14) is configured to compare the communication amount (163) contained in the information (163, 164) on the cooperation among the plurality of services (3) and a predetermined threshold value (1631) with one another, and determine a combination having the communication amount (163) exceeding the threshold value (1631) as a combination having a high relevance between the services (3).

According to the above-mentioned configuration, the service deployment control unit 1 stores the combination having a high relevance between the data processing services 3 in the relevant data processing service name 1656 of the service operation state table 165, to thereby be able to select the service deployment machine 2 to which the data processing services 3 are to be deployed so as to reduce the communication cost between the data processing services 3 highly relevant to each other.

(6) In the service deployment control system according to the above-mentioned item (4), the machine management module (11) is configured to calculate a communication cost (162) between the service providing computers (2), and the service deployment destination determination module (14) is configured to calculate the deployment cost (166) from the communication amount contained in the information (163, 164) on the cooperation among the plurality of services (3) and the communication cost (162).

According to the above-mentioned configuration, the service deployment control unit 1 generates the combinations of the candidates of the deployment destinations as the deployment patterns, calculates the deployment cost for each of the deployment patterns, and selects the deployment pattern having the minimum deployment cost. The service deployment control unit 1 deploys the data processing services 3 to the service deployment machines 2 having the selected deployment pattern, to thereby be able to achieve the determination of the service deployment machines 2 to which the data processing services are to be deployed, and the dynamic change in accordance with the operation environment of the computers.

(7) The service deployment control system according to the above-mentioned item (1) further includes an output module (the user output module 18) configured to output, as topology information (1820), the service providing computers (2) having the deployment pattern (61 to 63) determined as the deployment destinations of the services (3).

According to the above-mentioned configuration, the service deployment control unit 1 can optimize cooperation among the hierarchical data processing services 3 such as the devices 4, which output data, the service deployment machines 2, which provide the data processing services 3 as edge servers and process the data of the devices 4, and the service deployment machines 2, which provide the data processing services 3 in a form of a cloud, which further processes the data processed by the edge servers.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A service deployment control system, which includes a processor and a memory, and is configured to control a service, of a plurality of services, to be deployed to a service providing computer, of a plurality of service providing computers, which are coupled through a network, the service deployment control system comprising:

a machine management module configured to acquire a remaining storage capacity, an available calculation amount in units of bytes per time for each of the plurality of the service providing computers and respective communication delay amounts between each combination of the plurality of service providing computers, as the information of an operation of the service providing computers;

a network management module configured to acquire respective communication amounts, which is an amount of data per unit time, between each combination of the plurality of services, respective communication amounts between each combination of the plurality of service providing computers, and respective delay times between a device connected to each of the plurality of service providing computers as information of cooperation among the plurality of services;

a service management module configured to manage conditions for each service including a required calculation amount, a required storage capacity, and a permissible communication delay amount; and a service deployment destination determination module configured to;

determine at least two of the service providing computers that satisfy the respective conditions for the service based on the information on the operation as respective candidates of deployment destinations of the service, generate deployment patterns of deploying the service to the candidate deployment destinations of the service, calculate a deployment cost for each of the deployment patterns, select one of the deployment patterns having the minimum deployment cost, and determine the one of the selected deployment patterns as the deployment destination of the service.

2. The service deployment control system according to claim 1, wherein the service deployment destination determination module is configured to compare the communication amounts of the information on the cooperation among the plurality of services and a predetermined threshold value with one another, and determine a combination having the communication amount exceeding the threshold value as a combination having a high relevance between the services.

3. The service deployment control system according to claim 1, wherein the machine management module is configured to calculate a communication cost between the service providing computers, and wherein the service deployment destination determination module is configured to calculate the deployment cost from the communication amount contained in the information on the cooperation among the plurality of services and the communication cost.

4. The service deployment control system according to claim 1, further comprising an output module configured to output, as topology information, the service providing computers having the deployment pattern determined as the deployment destinations of the services.

5. A service deployment control method for controlling, by a management computer including a processor and a memory, a service, of a plurality of services, to be deployed to a service providing computer, of a plurality of service providing computers, which are coupled through a network, the service deployment control method comprising:

a machine management step of acquiring, by the management computer, a remaining storage capacity, an available calculation amount in units of bytes per time for each of the plurality of the service providing computer computers and respective communication delay amounts between each combination of the plurality of service providing computers, as the information of an operation of the service providing computers;

a network management step of acquiring, by the management computer, respective communication amounts, which is an amount of data per unit of time, between each combination of the plurality of services, respective communication amounts between each combination of the plurality of service providing computers, and respective delay times between a device connected to each of the plurality of service providing computers as information of cooperation among the plurality of services;

a service management step of managing, by the management computer, conditions for each service including a required calculation amount, a required storage capacity, and a permissible communication delay amount; and a service deployment destination determination step of determining, by the management computer, at least two of the service providing computers that satisfy the respective conditions for the service based on the information on the operation as respective candidates deployment destinations of the service;

generating combinations of deployment patterns of deploying the service to the candidate deployment destinations of the service;

calculating a deployment cost for each of the deployment patterns;

selecting a deployment pattern having the minimum deployment cost; and determining the selected deployment pattern as the deployment destination of the service.

6. The service deployment control method according to claim 5, wherein the service deployment destination determination step comprises comparing the communication amounts of the information on the cooperation among the plurality of services and a predetermined threshold value with one another, and determining a combination having the communication amount exceeding the threshold value as a combination having a high relevance between the services.

7. The service deployment control method according to claim 5, wherein the machine management step comprises calculating a communication cost between the service providing computers, and wherein the service deployment destination determination step comprises calculating the deployment cost from the communication amount contained in the information on the cooperation among the plurality of services and the communication cost.

8. The service deployment control method according to claim 5, further comprising outputting, as topology information, the service providing computers having the deployment pattern determined as the deployment destinations of the services.

9. A non-transitory computer-readable storage medium having stored thereon a program for causing a management computer, which includes a processor and a memory, to control a service, of a plurality of services, to be deployed to a service providing computer, of a plurality of service computers, which is coupled through a network, the program causing the management computer to execute:

a machine management step of acquiring a remaining storage capacity, an available calculation amount in units of bytes per time for each of the plurality of the service providing computers, and respective communication delay amounts between each combination of the plurality of service providing computers, as the information of an operation of the service providing computers;

a network management step of acquiring respective communication amounts, which is an amount of data per unit of time, between each combination of the plurality of services, respective communication amounts between each combination of the plurality of service providing computers, and respective delay times between a device connected to each of the plurality of service providing computers as information of cooperation among the plurality of services;

a service management step of managing conditions for each service including a required calculation amount, a required storage capacity, and a permissible communication delay amount; and a service deployment destination determination step of determining at least two service providing computers satisfying the respective conditions for the service based on the information on the operation as respective candidates deployment destinations of the service, generating deployment patterns of deploying the service to the candidate deployment destinations of the service, calculating a deployment cost for each of the deployment patterns, selecting one of the deployment patterns having the minimum deployment cost, and determining the one of the selected deployment patterns as the deployment destination of the service.

* * * * *